Patented Oct. 30, 1934

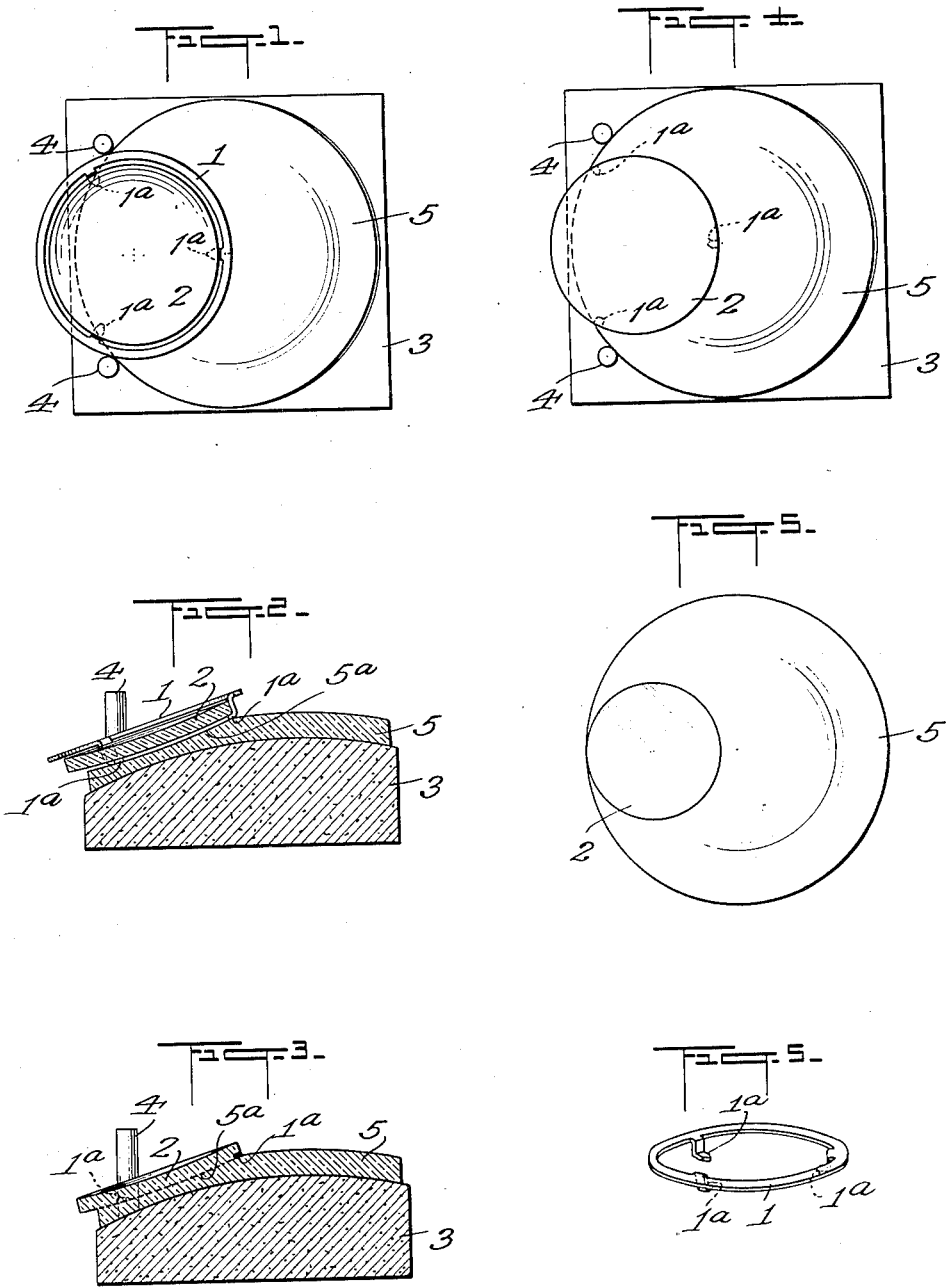

1,978,896

UNITED STATES PATENT OFFICE 1,978,896

FUSING METHOD AND CLIP IN THE MANUFACTURE OF FUSED MULTIFOCAL LENS BLANKS

George A. Clement, Mount Vernon, N. Y.

Application August 13, 1932, Serial No. 628,640

5 Claims. (Cl. 49—82.1)

This invention is applicable in the making of fused blanks for multifocal ophthalmic lenses, both bifocals and trifocals. For the purpose of illustration I am employing a bifocal lens blank, and hereinafter when the term bifocal is used, it will be understood that trifocal or multifocal may be substituted.

Such blanks are ordinarily made by fusing a button or segment of flint glass or other glass of relatively high index of refraction on to a countersink or seat prepared in the surface of a major lens blank consisting of a block or disc of crown glass or other glass of relatively low index of refraction, and the finished lens is thereafter formed from the blank, the face in which the segment is fused being ground and polished down to a smooth surface of continuous curvature, and the other side being shaped according to prescription. The area which includes the segment constitutes the stronger or reading lens portion of the bifocal lens.

In the manufacture of such blanks, the seat for the button or segment is prepared on the major lens by grinding and polishing a portion of one surface of the major lens to the desired curvature, and the glass button which is to be fused on this seat has its contact surface also properly ground and polished. Since the glass of the button has a lower fusing point than the glass of the major lens it will drop down and adapt itself to the shape of the seat.

Customarily the process employed involves the grinding and finishing of the prepared or contact surface of the segment to a somewhat lesser curve than that of the countersink, and placing the segment in the countersink in a tilted position and holding it tilted through a suitable fuse clip until it becomes plastic under the heat and drops down and fuses to the material of the countersink. The contact surfaces have initially a very small contact area and from that area the surfaces diverge with the result that the air is expelled from between the surfaces as the segment drops down progressively outwardly from the initial contact area.

While the entrapping of the air and the formation of air bubbles in the fused surfaces is thus avoided, it is nevertheless a recognized fact that the previous fusing methods do for various reasons cause many imperfections or defects in the fused surfaces which impair the usefulness of the finished lens. The sensitiveness of these surfaces to treatment is well known. After the surfaces are prepared and finished, only the greatest care can avoid the introduction of some trouble producing agent upon one or both of the surfaces as the elements are being mounted for fusing. The slightest grease or moisture from the fingers upon one of the contact surfaces, while probably invisible before fusing, will produce a defect commonly called a bubble which becomes prominently visible after fusing. The mere holding of the segment by the edges between the thumb and finger will often transfer sufficient moisture to the finished contact surface to cause trouble after fusing. While so held the surface is usually brushed with a soft brush to clean it, and a bristle of the brush passing first over the skin and then over the glass surface will transfer a streak of grease which after fusing produces a defect in the fused surface resembling a scratch.

Furthermore the mere touching together of the contact surfaces before fusing is a source of trouble. The initial contact area above referred to becomes a locus of defect after fusing in the nature of a bubble and known as the contact spot. This is due to a chemical action variously identified as oxidization, devitrification and crystallization. If the segment is moved about in the countersink before final location the trouble is accentuated.

Also the mere expanding or opening up of the finished surface of the segment to the greater curvature of the countersink as the segment becomes plastic and sinks down into the countersink as a mold, creates imperfections in the segment contact surface which show up as defects after fusing.

By my method the likelihood of defects arising in the fused surfaces is very substantially reduced. Contact of the fingers with the edge of the segment is avoided, the formation of contact spots is eliminated, and the need for initially making the contact surface of the segment curved to a lesser radius than its final form disappears.

In brief I employ for the segment a mounting ring which is preferably slightly larger in diameter than the segment and which has a plurality of inturned feet extending from one side, upon which feet the segment is laid with its contact side down. This ring is formed of some light material which will crumble or disintegrate under the heat of fusing. I have found aluminum or an alloy composed chiefly of aluminum to be suitable for the purpose, but other light metals having a low fusing point such as tin, and even certain fibers will do.

The block has at its lower edge two spaced upstanding pins and the major lens blank is laid on the block with the countersink disposed between the pins. The ring is set on the countersink and is held in place by resting against the pins. The feet entirely space the contact surfaces apart. As the segment becomes plastic it drops down first at the center since it is supported at the edge and then progressively comes into fusing contact with the countersink from the center outwardly. Since the segment becomes plastic before the glass of the countersink, the feet become embedded in the material of the segment and therefore are easily ground away.

A substantial advantage resulting from my process arises from the fact that the contact surfaces have a fire polish imparted to them before any contact is made and before fusion begins. The heat of fusion which is about 1250° F. is sufficient to give to the surfaces a perfect fire polish which is superior to surfaces produced solely by artificial polishing methods. The surfaces under the effect of the heat not only acquire a surpassing brilliancy and luster which denote the absence of potential defects, but they also have physical properties which cause them completely to coalesce without any tendency to open up or crack upon cooling, a tendency which is largely characteristic of fused lens elements which are wholly artificially polished.

The mounting ring forms a holder for the segment which permits the segment to be handled and cleaned without touching the edges or contact surfaces with the fingers. A finger pressed against the back of the segment holds it seated on the feet of the mounting ring while its contact surface is being cleaned in the usual manner with a brush or like implement. Since the fingers are outside the ring there is no likelihood of the brush touching the fingers and transferring grease to the contact surface.

After the segment is cleaned the mounting is set on the countersink, resting with its lower side against the pins on the block. The segment is thus accurately located and contact of the feet with the finished countersink surface is confined to the outer edge which is ground away in finishing the bifocal surface. The lightness of the mounting ring is a desirable characteristic since the ring will for that reason not sink into the surface of the countersink and thus require a deeper grinding to be removed. Furthermore the disintegration of the mount under the fusing heat provides for easy removal of the ring after the fusion is done. The ring either crumbles and is easily brushed away, or it is easily broken loose from the embedded feet and removed.

Other advantages of my invention will readily appear to those skilled in the art. In the drawing I have illustrated a satisfactory form of fuse clip embodying my invention, and shown it in connection with lens elements in various stages which will serve to illustrate the steps of my process.

Fig. 1 is a plan of the complete assembly ready for fusing, including the block, major lens blank and segment with its holder;

Fig. 2 is a central sectional elevation of the same;

Fig. 3 is a view similar to Fig. 2 showing the parts after fusing and removal of the segment mounting ring;

Fig. 4 is a plan of the parts shown in Fig. 3;

Fig. 5 is a plan of the lens blank after finishing on the bifocal side;

Fig. 6 is a detail in perspective of a segment mounting ring or holder.

The segment holder comprises a ring 1 with inwardly extending feet 1a attached to its inner periphery by integral legs extending parallel to the axis of the ring. The feet are thus disposed in a plane laterally offset from that of the ring. The feet are shown as three in number equally spaced apart. This number could be altered, but if only two are used it is obvious that their width must be considerably increased in order certainly to hold the segment clear of the countersink.

The segment or button 2 is placed in the holder, as shown especially in Figs. 1 and 2, with the finished or contact surface against the feet. When thus held the segment may be handled by grasping the ring between the thumb and finger and placing the end of another finger against the top of the segment to hold it in place. The bottom or contact surface of the segment is then exposed for cleaning without the danger of a cleaning brush striking the fingers and transferring grease to the finished surface.

The block 3 is a carborundum or other refractory block of the usual shape and form for the purpose. Near its edge on its lower side it is provided with two upstanding pins 4, properly located to receive the major lens blank 5 and center it upon the block. The major lens blank 5 will be placed upon the block with its countersink 5a between the two pins 4, that is, on the lower side of the block. The segment mounting is set on the countersink, the ring 1 resting against the pins 4, the parts being so proportioned that in this position the segment has the right relation to the countersink. According to present practice, the diameter of the countersink is such that in this position it extends over the edge of the major lens blank, as shown in Figs. 1 to 4, inclusive.

The parts mounted as shown in Figs. 1 and 2 are, according to the usual practice, placed in a fusing furnace. It will be noted that the contact surface of the segment is entirely spaced from the contact surface of the countersink by the feet 1a, and these surfaces remain spaced until they have taken the fire polish above referred to. Then the segment which has the lower fusing temperature becomes plastic and drops down first at the center and then progressively outwardly until it has coalesced with the material of the major blank throughout the entire area by which the segment overlies the countersink. The feet 1a have thereby become embedded in the material of the segment, as shown in Fig. 3. The segment mount has also become disintegrated from the effect of the heat and is easily removed, leaving the parts in the condition shown in Fig. 3. It will be understood that in that condition the complete coalescence will have obliterated the division between the two lens elements, which is indicated by the dotted line in Fig. 3, and that actually the two pieces of glass have become one.

It is to be noted that the contact surface of the segment is shown as having the same curvature as that of the countersink. This is possible by reason of the fact that the two surfaces are initially entirely out of contact and the further fact that the segment settles down first at the center, since it is held at the edge, and the fusing contact spreads progressively from the center outwardly, thereby expelling all air and avoiding the formation of bubbles due to entrapped air. The contact surface of the segment is not subjected to strain such as will develop defects, due to the fact that its eventual contour is not different from its initial contour.

The bifocal surface of the fused blank is finished by grinding down to a selected curvature according to the usual practice. In this process the diameter of the segment and countersink is reduced until the desired size of segment is obtained. This condition is illustrated in Fig. 5, in which it will be noted that the embedded feet 1a have been ground away in this finishing process.

While I have shown the parts in the usual relation for fusing, that is, with the segment over the major lens blank for the reason that the segment is usually composed of glass that has a lower fusing point than the major lens blank, glass is sometimes employed in which the relative fusing points are reversed. It will be understood therefore that my invention is in no wise limited to the exact relative arrangement of parts during the treatment comprising my process, and many obvious modifications both in the process and in the construction of clip shown and described will occur to one skilled in the art without departing from the scope of my invention as pointed out in the appended claims.

I claim:

1. In the manufacture of fused multifocal lens blanks, the method of fusing the segment to the countersink of the major lens blank which consists in grinding the opposing surfaces to approximately complementary shape, supporting the segment about its edge over the countersink with the two surfaces closely adjacent and entirely out of contact, and subjecting the members so mounted to heat and thereby causing the segment to settle down and coalesce with the material of the countersink first at the middle and then progressively outwardly to the periphery of the segment.

2. In the manufacture of fused multifocal lens blanks, the method of fusing the segment to the countersink of the major lens blank which consists in grinding the opposing surfaces to approximately complementary shape, disposing the segment upon spaced supports located within and about the edge of the countersink with the two surfaces closely adjacent and entirely out of contact, and subjecting the members so mounted to heat and thereby causing the segment to settle down and coalesce with the material of the countersink first at the middle and then progressively outwardly to the periphery of the segment.

3. In the manufacture of fused multifocal lens blanks, the method of fusing the segment to the countersink of the major lens blank which consists in grinding the opposing surfaces to complementary shape, disposing the segment upon spaced non-vitreous supports located within and about the edge of the countersink with the two surfaces parallel and closely adjacent but entirely out of contact, and subjecting the members so mounted to heat and thereby causing the segment to settle down and coalesce with the material of the countersink first at the middle and then progressively outwardly to the periphery of the segment.

4. For the fusing of multifocal lenses a segment support comprising an annulus composed of material which distintegrates at the fusing temperatures employed and has a plurality of inwardly extending feet attached to one of its sides and so disposed in a plane laterally offset from that of the annulus as to provide marginal rests for a segment within the annulus and restrain the segment in said offset plane.

5. For the fusing of multifocal lenses a fuse clip construction comprising a segment support in the form of an annulus composed of material which disintegrates at the fusing temperatures employed and has a plurality of inwardly extending feet attached to one of its sides and so disposed in a plane laterally offset from that of the annulus as to provide marginal rests for a segment within the annulus and restrain the segment in said offset plane, and a refractory block for the major lens blank having its mounting surface inclined relative to the base and having an upstanding positioning support at the lower edge thereof.

GEORGE A. CLEMENT.